March 5, 1935. G. W. ESCHENBACH 1,993,339
ADVERTISING APPARATUS
Filed Oct. 24, 1933 6 Sheets—Sheet 1
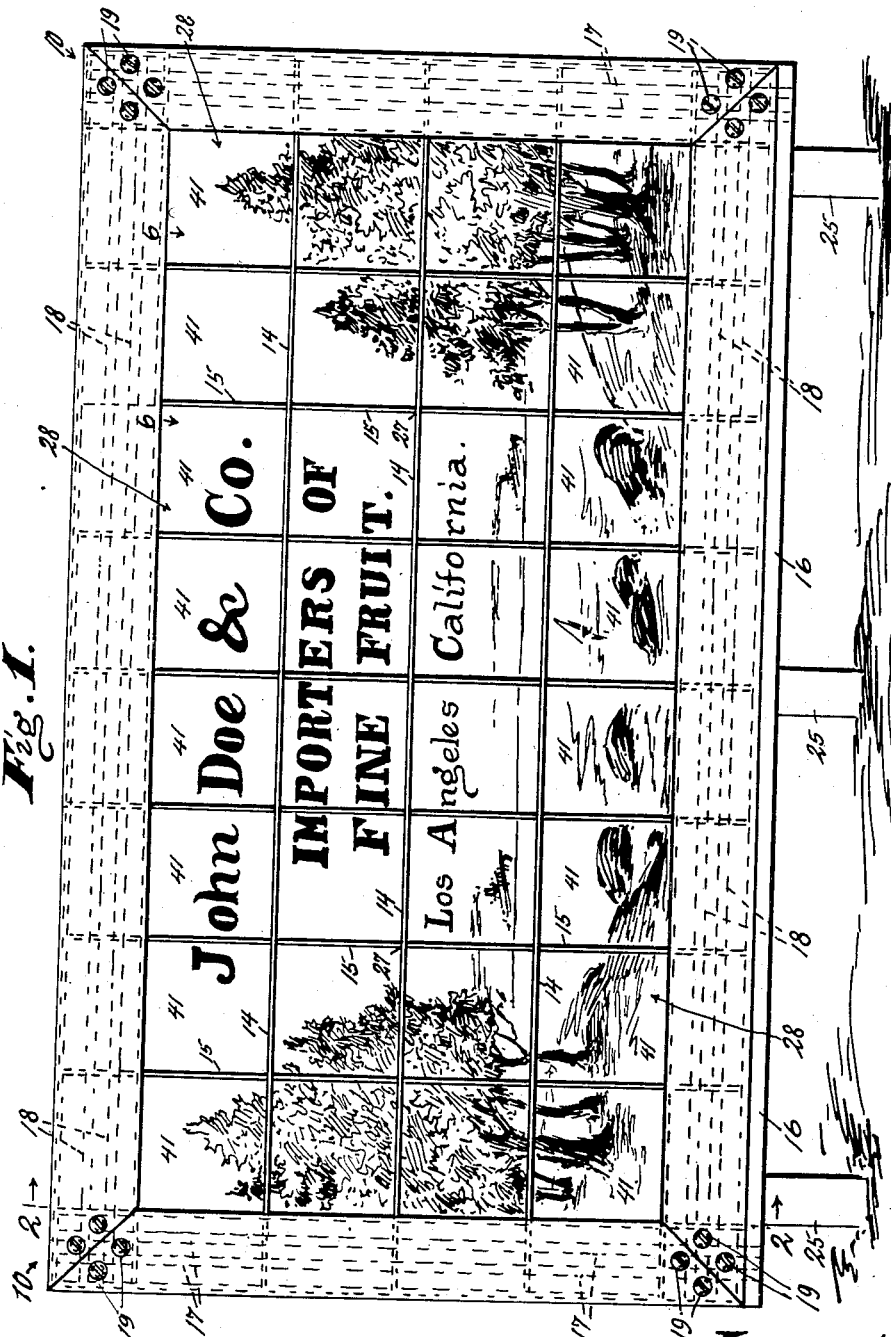
Inventor
Gustavus W. Eschenbach
By William M. Gentle
His Attorney.

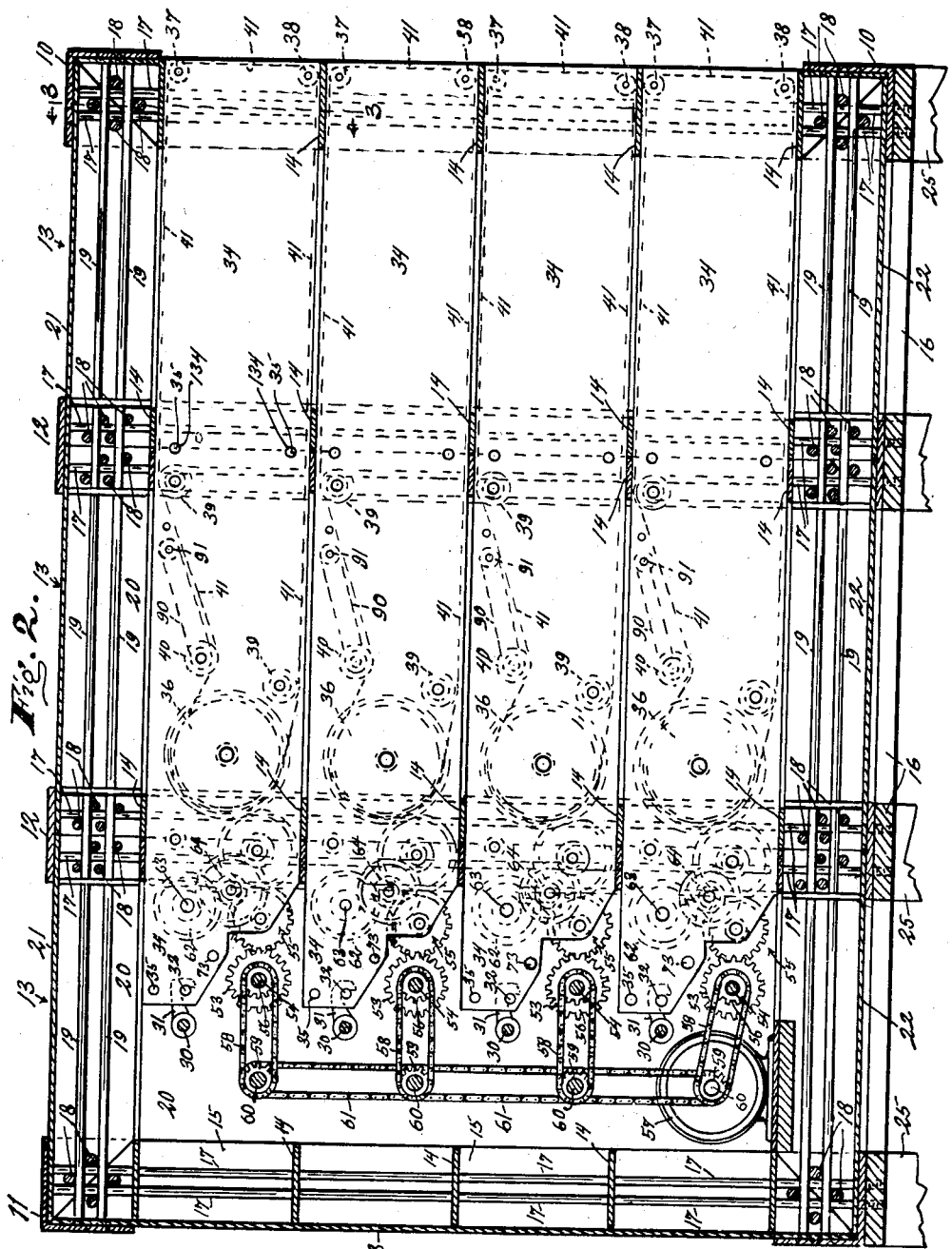

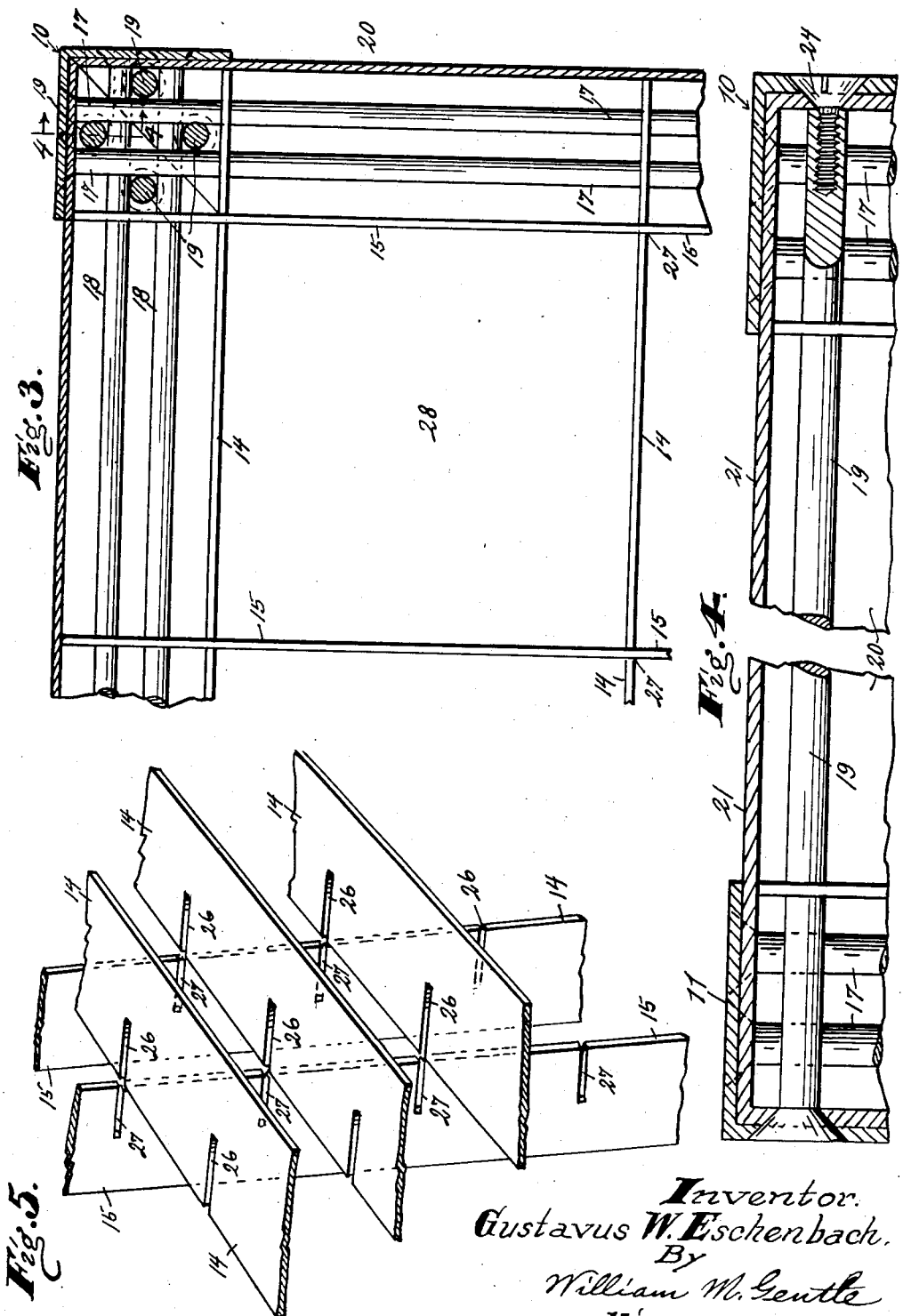

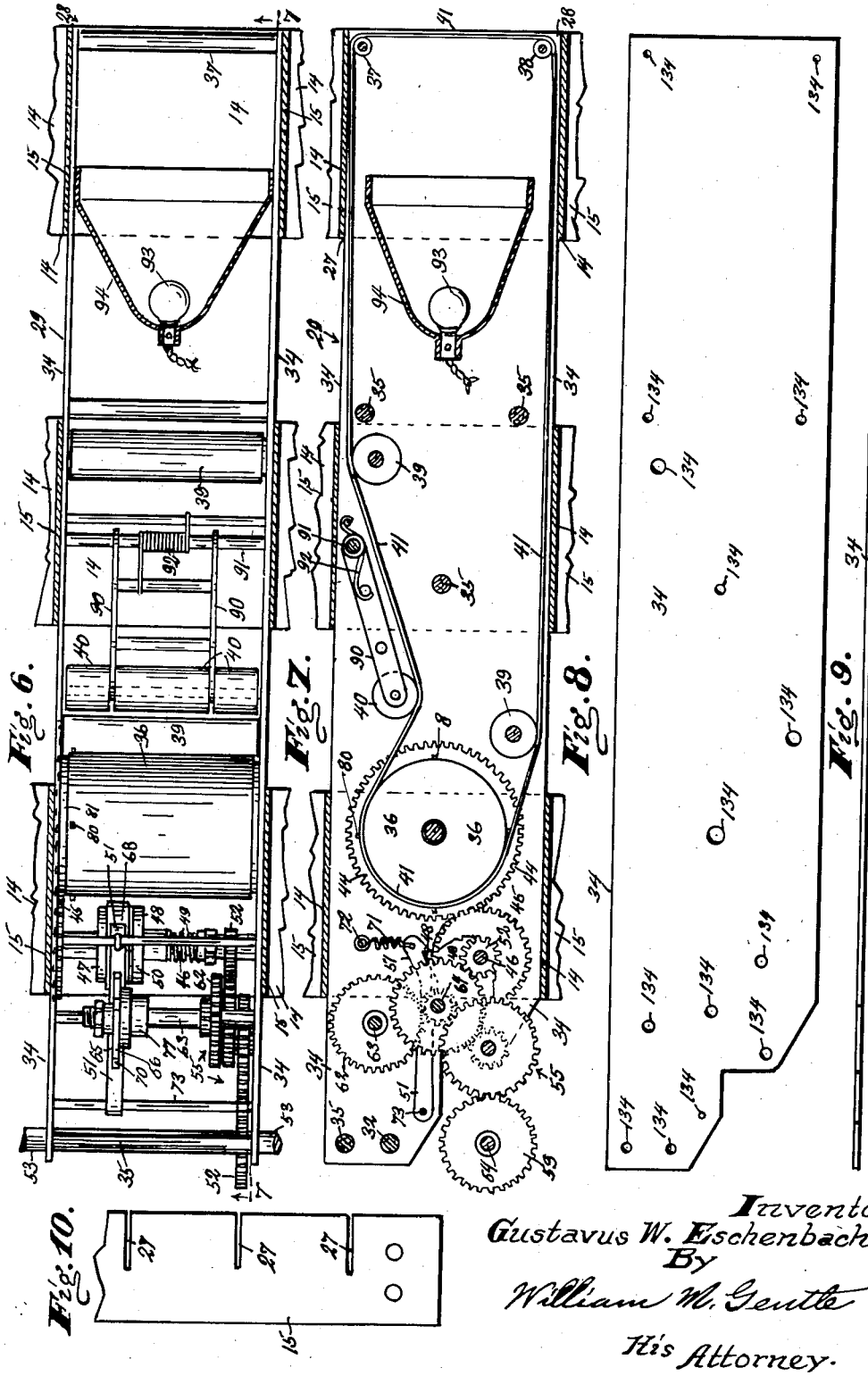

March 5, 1935.　　　G. W. ESCHENBACH　　　1,993,339
ADVERTISING APPARATUS
Filed Oct. 24, 1933　　　6 Sheets—Sheet 5
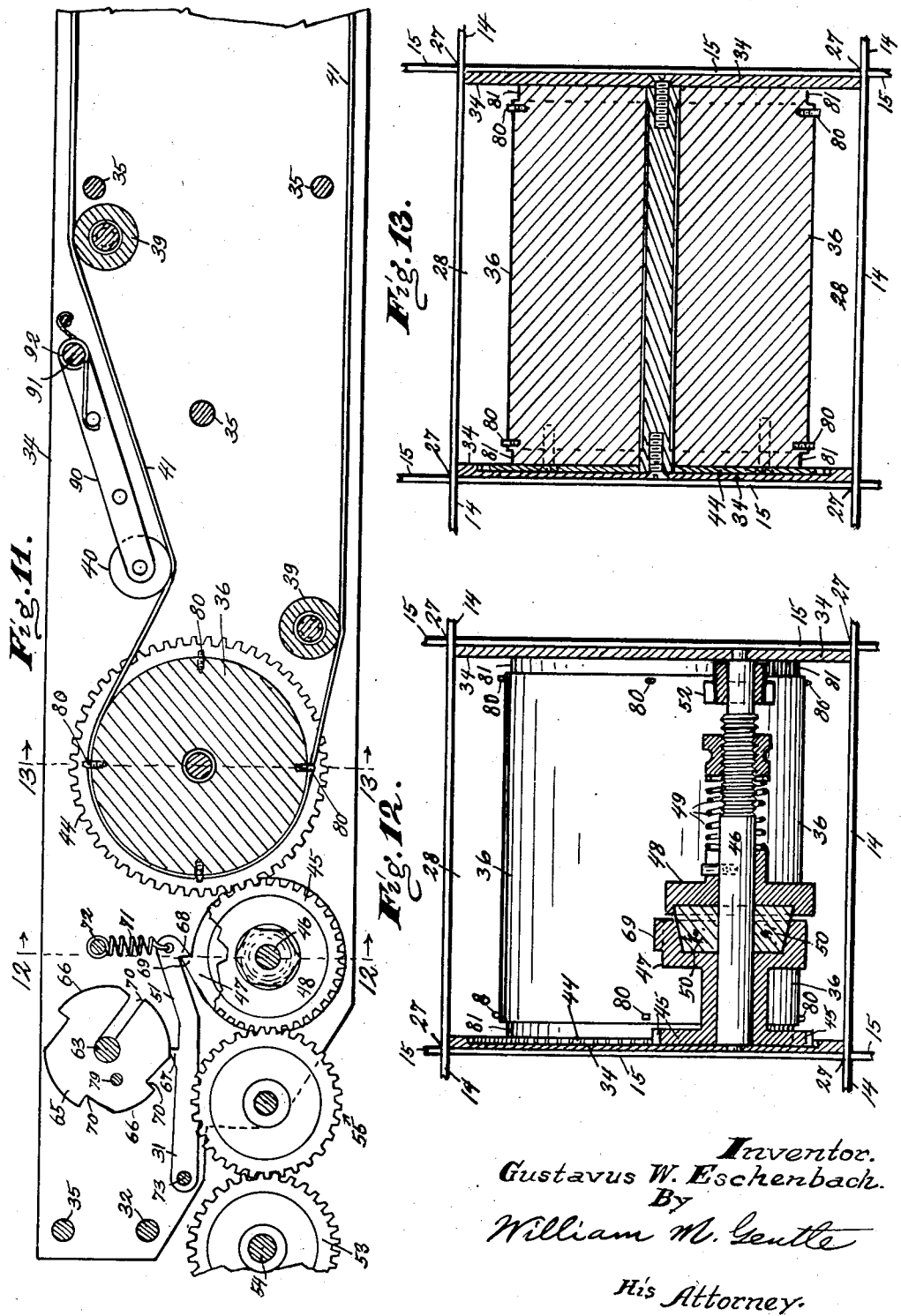
Inventor.
Gustavus W. Eschenbach.
By William M. Gentle
His Attorney.

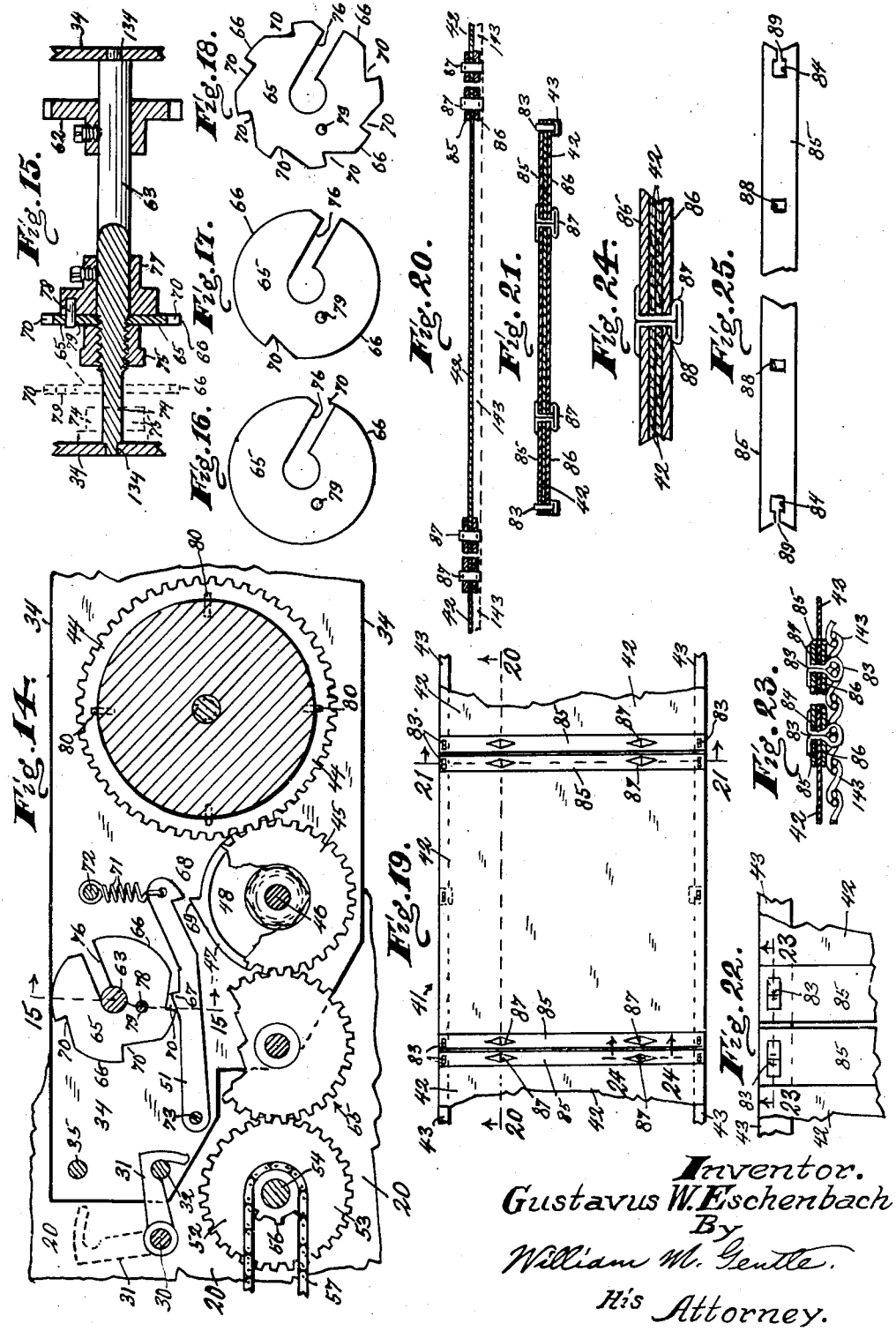

Patented Mar. 5, 1935

1,993,339

UNITED STATES PATENT OFFICE 1,993,339

ADVERTISING APPARATUS

Gustavus W. Eschenbach, Los Angeles, Calif.

Application October 24, 1933, Serial No. 695,027

12 Claims. (Cl. 40—32)

This invention relates to an advertising apparatus and is an improvement on my apparatus for displaying advertising, shown, described and claimed in my United States Letters Patent No. 1,894,512, granted January 17, 1933, and the principal object thereof is to provide an advertising apparatus constructed so that a major portion of its parts can be stamped out of metal in a finished condition ready to be assembled into a knock-down apparatus. To that end I provide front and rear knock-down frames that are connected by knock-down connections inside of which are knock-down frames having aligned rectangular openings therethrough into which advertising units can be slidably mounted; all of which structures, except the units, are detachably secured together by cross rods so they form a very rigid structure suitable for billboard advertising.

Another object of this invention is to provide an advertising apparatus that can be packed in a relatively small space and shipped in knocked-down form to a destination where it can be quickly and easily assembled and placed in operation.

Another object of this invention is to provide a sectional advertising apparatus that is constructed so that by adding sections thereto it can be enlarged to any desired size. That is, the apparatus can comprise four or more of the advertising units of greater or less length. In a full-sized bill-board it is preferred that the apparatus include thirty-two of the units, but it is understood that it can contain more or less of them.

A feature of invention is shown in the construction and operation of the advertising units and means for mounting and detachably securing them within the inner frame so that they are interchangeable with one another and are all driven independently of one another by a single motor.

Another feature of invention is shown in the means for intermittently starting and stopping the films of each unit, so they move independently of one another; and also a feature of invention is shown in the means for varying the number of times a film is actuated per revolution of its drive shaft.

Another feature of invention is shown in the construction of the slip-clutch that is interposed between the film and drive mechanism.

Another feature of invention is shown in the construction of the films whereby they are made in sections that can be detached and replaced with other sections when desired.

Other objects, advantages and features of invention may appear from the accompanying drawings, the subjoined detailed description and the appended claims.

The accompanying drawings illustrate the invention, in which:

Figure 1 is a front elevation of an advertising apparatus that is constructed in accordance with this invention shown semi-diagrammatically.

Fig. 2 is an enlarged vertical section on line 2—2 of Fig. 1 with many of the parts indicated fragmentally and semi-diagrammatically.

Fig. 3 is an enlarged fragmental vertical section on line 3—3 of Fig. 2.

Fig. 4 is a fragmental section on line 4—4 of Fig. 3, showing the construction of one of the tie rods.

Fig. 5 is a perspective view of a group of the interior frame parts arranged to be telescoped together.

Fig. 6 is a section on line 6—6 of Fig. 1 showing the detailed construction of one of the advertising units with the endless film omitted for the sake of clearness in the drawings.

Fig. 7 is a longitudinal section on line 7—7 of Fig. 6 with the endless film diagrammatically indicated.

Fig. 8 is a detail of one of the side plates of a unit indicated in finished form when stamped out of sheet metal.

Fig. 9 is an edge view of the side plate shown in Fig. 8.

Fig. 10 is a fragmental side view of one of the metal plates in the interior frame indicating how it is stamped out ready to be demountably connected in the apparatus.

Fig. 11 is a sectional view analogous to the left-hand porton of Fig. 7 with parts omitted and other parts broken away to more clearly show the engaged position of the ratchet lever in the intermittent stop mechanism.

Fig. 12 is an enlarged cross section on line 12—12 of Fig. 11.

Fig. 13 is another enlarged cross section on line 13—13 of Fig. 11, showing how the film master roller and its gear are mounted in between the side frames of a unit.

Fig. 14 is an enlarged fragmental sectional view analogous to Fig. 11 showing the disengaged position of the ratchet lever in the intermittent stop mechanism.

Fig. 15 is a fragmental cross section on line 15—15 of Fig. 14 showing a stop cam mounted on its shaft.

Figs. 16, 17 and 18 show stop cams with a varied number of stop notches therein.

Fig. 19 is a fragmental plan view of an endless film showing it made up of detachable sections.

Fig. 20 is a section on line 20—20 of Fig. 19 with the endless chain indicated by dotted lines.

Fig. 21 is a cross section on line 21—21 of Fig. 19.

Fig. 22 is an enlarged fragmental view of the upper left hand corner of Fig. 19.

Fig. 23 is an enlarged section on line 23—23 of Fig. 22, showing the film sections secured to an endless chain.

Fig. 24 is a section on line 24—24 of Fig. 19.

Fig. 25 is a fragmental plan view of a modified end plate for the film sections showing its ends slotted so they can be detachably connected to a clip.

My advertising apparatus includes front, rear and intermediate outer knock-down frames 10, 11 and 12 that are joined by knock-down connections 13 that enclose the inner knock-down frames that are formed of horizontal plates 14 and vertical plates 15, all of which are secured together and to a base 16 by rods 17, 18 and 19 so they form a very rigid structure that can be easily erected and knocked down when desired as for packing and shipping.

As clearly shown in the drawings, the frames 10, 11 and 12 are made up of angle irons to which the sides 20, top 21 and bottom 22 and back end 23 are secured by the aforementioned rods.

The vertical rods 17, as indicated in the drawings, have flanged screw heads and lower threaded ends so they can be secured in the base 16; and the longitudinal rods 19 and cross rods 18 have screw heads at one of their ends and are intermittently threaded at their other ends for the lock screws 24 by which rods 18 and 19 are releasably secured in the knock-down structure, see Figs. 2, 3 and 4.

When the apparatus is used as a bill-board it is supported on posts 25, as indicated in Figs. 1 and 2; but it is understood that when used in a show window or on a counter that the posts 25 are not necessarily used.

The horizontal plates 14 and vertical plates 15 of the inner frames have complementary slots 26 and 27 by means of which the plates are telescoped together to form a plurality of rectangular openings 28 through each of the inner frames, and these openings extend horizontally from the open front of the apparatus toward the back end thereof.

The openings 28 are aligned horizontally so the advertising units 29 can be removably inserted into them.

Cross locking rods 30 are arranged adjacent the rear end of the apparatus that carry locking hooks 31 that are detachably secured over the lower spacing rods 32 of each unit to hold them within their respective opening 28 and with their front ends in exact register or vertical alignment with the front face of the apparatus.

The rods 30 are provided with countersunk screw heads 33 so that they can be turned by a screwdriver to release the hooks 31 from the rods 32 when the units 29 are to be removed for the purpose of changing and interchanging them.

All of the rectangular openings 28 are substantially the same size so that the units 29, which are also all of the same size, easily slide into these openings and are interchangeable therein as described in my prior patent hereinbefore mentioned. The units 29 are all constructed substantially alike so that a description of one will describe all of them.

A unit includes the parallel side plates 34 that are spaced apart by the rod 32 and rods 35 and between these plates a master film roller 36 is arranged together with the top and bottom front rollers 37 and 38, guide rollers 39 and tension roller 40 over which the endless film 41 is extended.

As indicated in Figs. 8 and 9, the side plates 34 can be stamped out of sheet metal with the bearing holes 134 for the shafts and spacing rods all in an exact position so that assembling of the parts will be greatly facilitated.

The film 41 is preferably formed of detachable sections 42 that are detachably secured to parallel tapes 43 or chains 143, as best shown in Figs. 19 to 25 inclusive, but it is understood that I may use any suitable form of film. Also it is understood that the pictorial advertising is placed on the sections 42 when such a film is used.

The film 41 is driven by a gear 44 that is secured to one end of the roller 36, and this gear meshes with a pinion 45 that is loosely mounted on the shaft 46 and integral with stop disk 47 that is also loosely mounted on the shaft 46.

Also mounted on the shaft 46 is another disk 48 that is forced endwise by a spring 49 on the shaft against a friction block 50 that is seated in a cavity in the disk 47 so that when the shaft 46 is driven and the disk 47 is released from the toothed or ratchet lever 51 the disks 47 and 48 will rotate together to drive the film 41.

The shaft 46 is provided with a gear 52 that is in driving connection with a gear 53 on a shaft 54 by a train of gears 55, as best shown in Figs. 2 and 7.

There is a shaft 54 for each tier of units, and in this apparatus four of these tiers are shown with each having eight units therein or a total of thirty-two units.

The shafts 54 are provided with pinions 56 that are in driving connection with the motor 57 by the chains 58, gears 59, shafts 60 and master chain 61, see Fig. 2.

A gear 62 on the shaft 63 is in mesh with a pinion 64 that is driven by the train of gears 55 to rotate the cam disk 65 that is arranged so that its peripheral surface 66 engages a tooth 67 on the lever 51 and normally holds a tooth 68 on its outer end engaged with a tooth 69 on the disk 47 to hold the latter from rotation when the shaft 46 is driven.

Spaced notches 70 are provided in the edge portion of the disk 65 into which the tooth 67 can be drawn by the tension of the spring 71 that has one of its ends secured to the toothed end of the lever 51 and its other end is secured to a cross rod 72. The lever 51 has its other end pivotally mounted on a cross rod 73 so that when the disk 65 is turned into position for the tooth 67 to enter one of the recesses 70 the tooth 68 will be released by the spring 71 so that the disk 47 can rotate until the tooth 67 is again engaged by the peripheral edge 66 and the lever 51 is depressed against the tension of the spring 71 to re-engage the tooth 68 with the tooth 69 to stop the rotation of the disk 47.

It is obvious that the film 41 will be rotated when the disk 47 is revolved and the notches 70 are a sufficient depth and length to permit one section of the film 41 to be moved upward out of register with an opening 28 and replaced by another section.

As indicated in Figs. 14 to 18, the disk 65 can be provided with two or more recesses 70, and these disks are removable and interchangeable.

The shaft 63 is reduced in size at 74 so that when the nut 75 is moved from its full line to its dotted position, the disk 65 can also be moved from its full line to the dotted position to bring the slot 76 in the disk in register with the reduced portion of the shaft so it can be removed and replaced with another one.

The disk 65 is held centrally over the lever 61 by an adjustable stop disk 77 on the shaft 63 against which it is punched by the nut 74: and the disk 77 carries a centering pin 78 that is extended through a hole 79 in the disk 67 so that when a disk is replaced by another one it will be held in a proper position by the pin 78 so that a retiming of parts will not be necessary.

The film roller 36 is provided with pins 80 that aid in driving the film 41 whether it be an endless tape film as diagrammatically indicated in Figs. 2, 7 and 11: or when the film is formed of sections as indicated in Figs. 19 to 25 inclusive: and also annular recesses 81 are provided at the ends of this roller to form a clearance for tapes 43 and chains 143.

When parallel chains 143 are used to carry the film sections 42 they are detachably secured thereto by clips 83. These clips are first extended through the links of the chain and then through the end holes 84 in the end cross bars 85 and 86 after which the ends are bent down on the top bars 85 to detachably hold the parts together.

The bars 85 and 86 are secured to the ends of the section 42 by clips 87 that are extended through the registering holes 88 and the ends of the films as indicated in the drawings.

If desired the ends of the bars 85 and 86 can be slotted as at 89 so their ends can be slipped on and off of the narrow neck of the clips 83 if so desired.

The tension rollers 40 are supported on a frame 90 that is pivoted on the cross bar 91 and a spring 92 holds these rollers engaged with the film 41 to hold it taut on the front rollers 37 and 38 so that the section of the film exposed in the opening 28 will be aligned with all the exposed sections of the other films and with the front of the apparatus.

The plates 14 and 15 of which the inner frames are formed are very thin, as are also the side plates 34 of the units so that the space between the units can hardly be noticed from a bill board reading distance when the films are provided with pictorial advertising matter.

If desired each unit can be provided with a lamp 93 and reflector 94 as diagrammatically indicated in Figs. 6 and 7. The detailed construction and operation of this lighting mechanism will be claimed in a separate application for U. S. Letters Patent, and is shown herein only for the purpose of illustration.

In operation the motor 57 through the driving connections hereinbefore described drives the shafts 46 and 63 of all the units so that when the disk 47 of any unit is released by its respective lever 51 the films of that unit will be moved to change its part of the panoramic scene and advertising on the face of the bill board.

The cam disks 65 of the respective units can be set by adjustment of the disk 77 on the shaft 63 so that all the films will be actuated either together or separately, and the disks 65 can have any desired number of notches 70 all alike as to number or different so there would be either a uniform or promiscuous movements of the films.

As fully described in my prior patent the pictorial features of my films match at adjacent edges and the movements of the films whether together or promiscuously produce varied panoramic advertising pictures.

What I claim as my invention is

1. An advertising apparatus including a base, outer knock down frames at the front and rear of said base, inner knock down frames arranged within said outer frames that have aligned rectangular openings therethrough, sectional connections between said front and rear frames, intermediate frames in said connections that have rectangular openings aligned with the openings through said inner frames, and cross rods for detachably securing said base, frames and connections together so that advertising units can be inserted from the front into the rectangular openings through said inner and intermediate frames.

2. An advertising apparatus including a base, outer knock down angle iron frames at the front and rear of said base, knock down sheet metal frames within said outer frames that have aligned rectangular openings therethrough, angle iron connections between said front and rear frames, cross rods for detachably securing said frames and connections to said base, and advertising units removably secured in the rectangular openings through said inner frames.

3. An advertising apparatus including a base, angle irons thereon arranged to form outer frames at the front and rear ends thereof, intermediate outer frames, sectional connections between said frames, sheet metal plates arranged to telescope together to form inner frames within said outer frames having rectangular openings therethrough, advertising units adapted to be removably inserted into the openings through said inner frames; and cross rods for detachably securing said angle irons and sheet metal plates together.

4. In an advertising apparatus the combination with an outer knock down frame having an open front and inner knock down frame therein having compartments therein open to the front end of said outer frame, of a plurality of advertising units in said compartments having front ends aligned with the open front of said outer frame, and means connected with said units for displaying advertising on the front of said apparatus.

5. In an advertising apparatus the combination with an outer knock down frame having an open front end, inner knock down frames therein having compartments therein open to the front end of said outer frame, of a plurality of advertising units slidably mounted in said compartments, hooks adjacent the rear end of said outer frame for detachably holding said units with their outer ends aligned with the open front of said outer frame, and means connected with said units for displaying pictorial advertising over the front of said apparatus.

6. In an advertising apparatus the combination with an outer knock down frame having an open front end, inner knock down frames therein having compartments therein open to the front end of said outer frame, of a plurality of advertising units slidably mounted in said compartments, hooks adjacent the rear end of said outer frame for detachably holding said units with their outer ends aligned with the open front of said outer frame, and means including an endless film for each unit for displaying moving pictorial advertising over the front of said apparatus.

7. In an advertising apparatus the combination with an outer knock down frame having an open front end, inner knock down frame therein having compartments therein open to the front end of said outer frame, of a plurality of advertising units slidably mounted in said compartments, hooks adjacent the rear end of said outer frame for detachably holding said units with their outer ends aligned with the open front of said outer frame, an endless film having pictorial advertising thereon for each unit, and means for intermittently and promiscuously moving said films to display panoramic pictorial advertising over the front of said apparatus.

8. In an advertising apparatus the combination with an outer knock down frame having an open front end, an inner knock down frame therein having a plurality of compartments therethrough, of a plurality of advertising units slidably mounted in the compartments of said inner frame, hooks adjacent the rear end of said outer frame for detachably holding said units so their front ends are aligned with the front end of said outer frame, a moving picture advertising film for each unit, sets of rollers for each film, and means for actuating said sets of rollers to move said films to display the advertising thereon over the front of said apparatus.

9. In an advertising apparatus the combination with an outer knock down frame having an open front end, an inner knock down frame therein having a plurality of compartments therethrough, of a plurality of advertising units slidably mounted in the compartments of said inner frame, hooks adjacent the rear end of said outer frame for detachably holding said units so their front ends are aligned with the front end of said outer frame, a moving picture advertising film for each unit, sets of rollers for each film, and means for actuating said sets of rollers independently of one another to promiscuously move said films to display the advertising thereon over the front of said apparatus.

10. In an advertising apparatus the combination with an outer knock down frame having an open front end, an inner knock down frame therein having a plurality of compartments therethrough, of a plurality of advertising units slidably mounted in the compartments of said inner frame, hooks adjacent the rear end of said outer frame for detachably holding said units so their front ends are aligned with the front end of said outer frame, a moving picture advertising film for each unit, sets of rollers for each film, means for actuating said sets of rollers intermittently and independently of one another to promiscuously move said films to display the advertising thereon over the front of said apparatus, and a slip clutch and cam stop within each of said units for causing the intermittent movement of said sets of rollers.

11. In an advertising apparatus the combination with an outer knock down frame having an open front end, an inner knock down frame therein having a plurality of compartments therethrough, of a plurality of advertising units slidably mounted in the compartments of said inner frame, hooks adjacent the rear end of said outer frame for detachably holding said units so their front ends are aligned with the front end of said outer frame, a moving picture advertising film for each unit, sets of rollers for each film, a motor for driving said sets of rollers, and a slip clutch and stop for each set of rollers that are interposed between said motor and rollers to cause an intermittent movement of said films to display pictorial advertising over the front of said apparatus.

12. In an advertising apparatus the combination with an outer knock down frame having an open front end, an inner knock down frame therein having a plurality of compartments therethrough, of a plurality of advertising units slidably mounted in the compartments of said inner frame, hooks adjacent the rear end of said outer frame for detachably holding said units so their front ends are aligned with the front end of said outer frame, a moving picture advertising film for each unit, sets of rollers for each film, a motor for driving said sets of rollers, a slip clutch and cam stop mechanism for each set of rollers, and a chain of speed reduction gears interposed between said sets of rollers and said motor whereby said films are slowly and intermittently actuated to display pictorial advertising on the front of said apparatus.

GUSTAVUS W. ESCHENBACH.